United States Patent
Deandrea

[11] Patent Number: 6,149,366
[45] Date of Patent: Nov. 21, 2000

[54] CELLULAR DEPOT WITH HYDROPNEUMATICALLY-DRIVEN CONVEYOR CARS

[75] Inventor: Giorgio Deandrea, Rivoli, Italy

[73] Assignee: Fata Automation S.p.A., Pianezza, Italy

[21] Appl. No.: 09/126,440

[22] Filed: Jul. 30, 1998

[30] Foreign Application Priority Data

Jul. 30, 1997 [IT] Italy .................. MI97A1817

[51] Int. Cl.⁷ .................. B65G 1/04; B65G 1/06
[52] U.S. Cl. .................. 414/279; 414/279
[58] Field of Search .................. 414/277, 281, 414/282, 273, 279, 284, 495, 498, 254, 239, 240, 245, 246, 255

[56] References Cited

U.S. PATENT DOCUMENTS

| | | | |
|---|---|---|---|
| Re. 27,871 | 1/1974 | O'Connor | 214/16.4 A |
| 2,578,959 | 1/1951 | Yarborough | 60/51 |
| 3,417,879 | 12/1968 | Gough | 214/16 |
| 3,556,015 | 1/1971 | Kruer et al. | 104/157 |
| 3,709,383 | 1/1973 | Jennings et al. | 414/279 |
| 3,712,489 | 1/1973 | Jamison | 414/528 |
| 3,718,097 | 2/1973 | Tourneau et al. | 414/277 |
| 3,746,189 | 7/1973 | Burch et al. | 414/277 |
| 3,770,151 | 11/1973 | Jamison | 414/809 |
| 3,800,963 | 4/1974 | Holland | 214/16.4 |
| 3,840,131 | 10/1974 | Castaldi | 214/16.4 A |
| 3,851,593 | 12/1974 | Gagnon et al. | 104/88 |
| 3,866,767 | 2/1975 | Zollinger et al. | 214/650 |
| 3,869,028 | 3/1975 | Sawada et al. | 191/1 R |
| 3,978,995 | 9/1976 | Zollinger et al. | 414/279 |
| 4,016,986 | 4/1977 | Thomas | 214/16.4 A |
| 4,273,494 | 6/1981 | Swain et al. | 414/284 |
| 4,274,509 | 6/1981 | Thomson et al. | 198/500 |
| 4,286,911 | 9/1981 | Benjamin | 414/273 |
| 4,295,538 | 10/1981 | Lewus | 180/165 |
| 4,406,570 | 9/1983 | Duncan et al. | 414/282 |
| 4,459,078 | 7/1984 | Chiantella et al. | 414/279 |
| 4,993,905 | 2/1991 | Potocnjak | 414/277 |
| 5,059,392 | 10/1991 | Wijts | 414/279 |
| 5,238,348 | 8/1993 | Reimer | 414/254 |
| 5,599,154 | 2/1997 | Holscher et al. | 414/277 |
| 5,636,727 | 6/1997 | Neri et al. | 414/278 |
| 5,833,427 | 11/1998 | Siegler et al. | 414/277 |
| 5,862,663 | 1/1999 | Lanza et al. | 60/432 |

FOREIGN PATENT DOCUMENTS 4327382 2/1995 Germany.

*Primary Examiner*—Robert O. Olszewski
*Assistant Examiner*—Paul T. Chin
*Attorney, Agent, or Firm*—Jacobson, Price, Holman & Stern, PLLC

[57] ABSTRACT

A cellular depot including a plurality of cells facing onto a corridor through which runs at least one motor-driven car to convey loads between the cells. The car includes a trolley which is motor-driven to move between the car and the inside of a cell and transfer a load stored or to be stored to and from the car and cell. The trolley includes a hydraulic drive connected, for their power supply, to an independent source of fluid under pressure, which is automatically recharged when the trolley is accommodated on the car.

12 Claims, 3 Drawing Sheets

6,149,366

CELLULAR DEPOT WITH HYDROPNEUMATICALLY-DRIVEN CONVEYOR CARS

BACKGROUND OF THE INVENTION

This invention refers to a cellular depot comprising innovative cars or transelevators for moving loads, for example containers, to and from the cells.

There are known depots composed of a reticulated structure forming a plurality of cells disposed side by side in rows on several floors. The cells face, with an aperture for inserting and removing, onto a corridor along which the conveyor cars run.

As a rule, the cars run along rails parallel to the rows of cells and carry telescopic forks or movable platforms which are motor-driven to enter the cells and withdraw or deposit the load.

In the case of very large loads, such as for example containers, motor vehicle bodies, tube nests, etc., the forks or platforms have to carry out a very long stroke to insert themselves completely into the cells.

As the stroke increases, the problems deriving from clearances, elasticity and overall dimensions of the telescopic parts increase until such solutions rapidly become technically and economically disadvantageous. Cellular depots have been proposed, in which the transelevators or cars comprise guides which couple with guides provided in each cell, to enable an electric motor-driven trolley to transfer the loads between the transelevator and the cell.

In order to provide power to the trolley,. complicated movable electrical connections have been proposed, such as rigid conductors with sliding shoes, cables with winding drum, flexible track elements, etc. Such connections are sources of problems and intense maintenance due to the large number of handling cycles that the trolleys carry out. In addition, they often call for excessively large volumes of space.

It has also been proposed to use batteries to supply power to the trolley, to render it independent. To avoid the periodical stoppages of the system for recharging the accumulators, depots have been proposed in which, when the trolley is completely accommodated on the car, the electric accumulator is connected, for recharging, by means of an automatic electric coupling, to a source of power reaching the car.

The use of electric accumulators, which although offering advantages as compared to the use of permanent electric connections between the car and the trolley, lead to other problems of a practical nature. In fact, it is necessary to carry out a periodical check of the accumulators and the recharging systems, the accumulators must be replaced at the end of their life cycle, precautions must be taken against the risk of emission of gas when recharging and the loss of highly corrosive liquid (which, moreover, is in any case always potentially dangerous to handle during maintenance operations). In addition, the system is relatively sensitive to jolting and vibrations, which are inevitable during operation.

It must also be considered that the electric accumulators suffer a shortening of their average lifespan whenever they are subjected to brief and frequent running down and recharging cycles, and that the temperatures in the depots (for example refrigerated) may be outside the normal values for operation of the accumulators. Lastly, the electric accumulators are of standardized dimensions which make it necessary to adapt the dimensions of the trolley to the accumulators, resulting in considerable thickness of the trolley and a loss of useful space within the cells.

The general scope of this invention is to obviate the aforementioned problems by providing a cellular depot system in which the cars comprise transfer trolleys which are independent, enable the intensive and continuous use of the system, are sturdy and reliable, and have limited overall dimensions and low manufacturing and maintenance costs.

SUMMARY OF THE INVENTION

This scope is achieved, according to the invention, by providing a cellular depot comprising a plurality of cells facing onto a corridor along which runs at least one motor-driven car to transport loads between the cells, the car comprising a trolley which is motor-driven to move between the car and the inside of a cell and transfer a load stored or to be stored to and from the car and cell, characterized by the fact that the trolley comprises hydraulic drive means connected, for their power supply, to an independent source of fluid under pressure disposed on the trolley and recharged when the trolley is accommodated on the car.

BRIEF DESCRIPTION OF THE DRAWINGS

The innovative principles of this invention and its advantages with respect to the known technique will be more clearly evident from the following description of a possible exemplificative embodiment applying such principles, with reference to the accompanying drawings, in which.

DETAILED DESCRIPTION OF THE INVENTION

Figure 1:
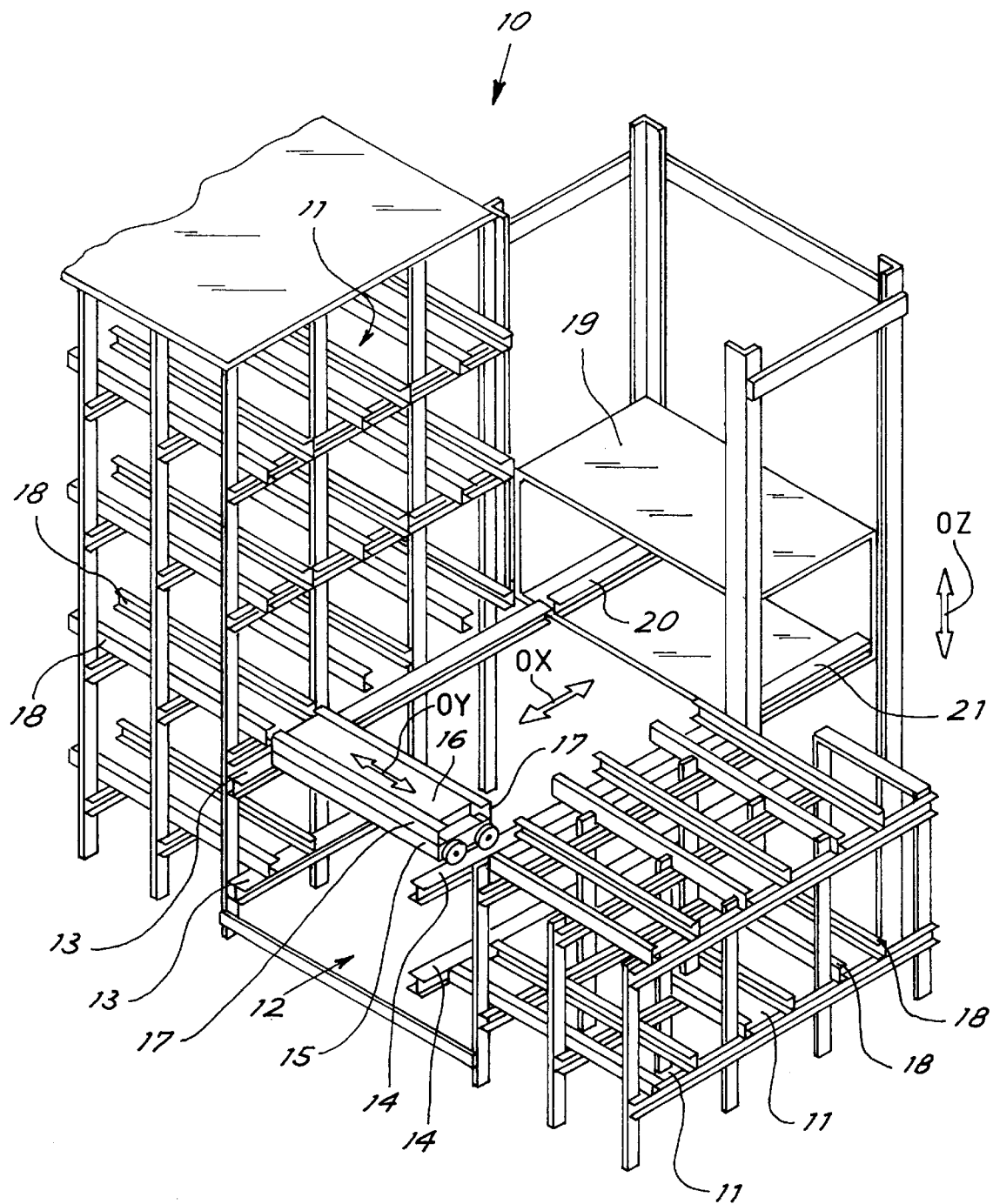
FIG. 1 shows a schematic perspective sectional view of a depot made according to the invention.

With reference to the figures, FIG. 1 shows a partial view of an automated depot (generically indicated by reference 10), made according to the invention. The depot 10 comprises a reticulated structure, composed of a series of horizontal and vertical beams to create a plurality of cells 11 facing onto a central corridor 12.

Disposed on each floor of cells on either side of the corridor are rails 13, 14 along which run motor-driven cars 15, only one of which is shown for simplicity in the drawing. The car running along the respective pair of rails in the direction indicated by OX can come to rest in line with each cell on the floor. As will be explained further on, the car 15 is provided superiorly with a trolley 16 which can move crosswise to the movement of the car (that is to say in the direction OY) to enter a cell in front of the car. The trolley runs on rails 17 mounted on the car and on complementary rails 18 inside the cell. Disposed at the end of the corridor (on just one or both sides thereof) are elevators 19 which move vertically in the direction OZ to transfer the cars from one floor to another. For this purpose, each elevator is internally provided with a pair of rails 20, 21 extending the rails 13, 14.

With the structure described above, a car can move between the cells facing onto the corridor until it comes face to face with a pre-established cell in which to insert its trolley to withdraw or deposit a load.

Up to this point a substantially known technique has been described.

Figure 2:
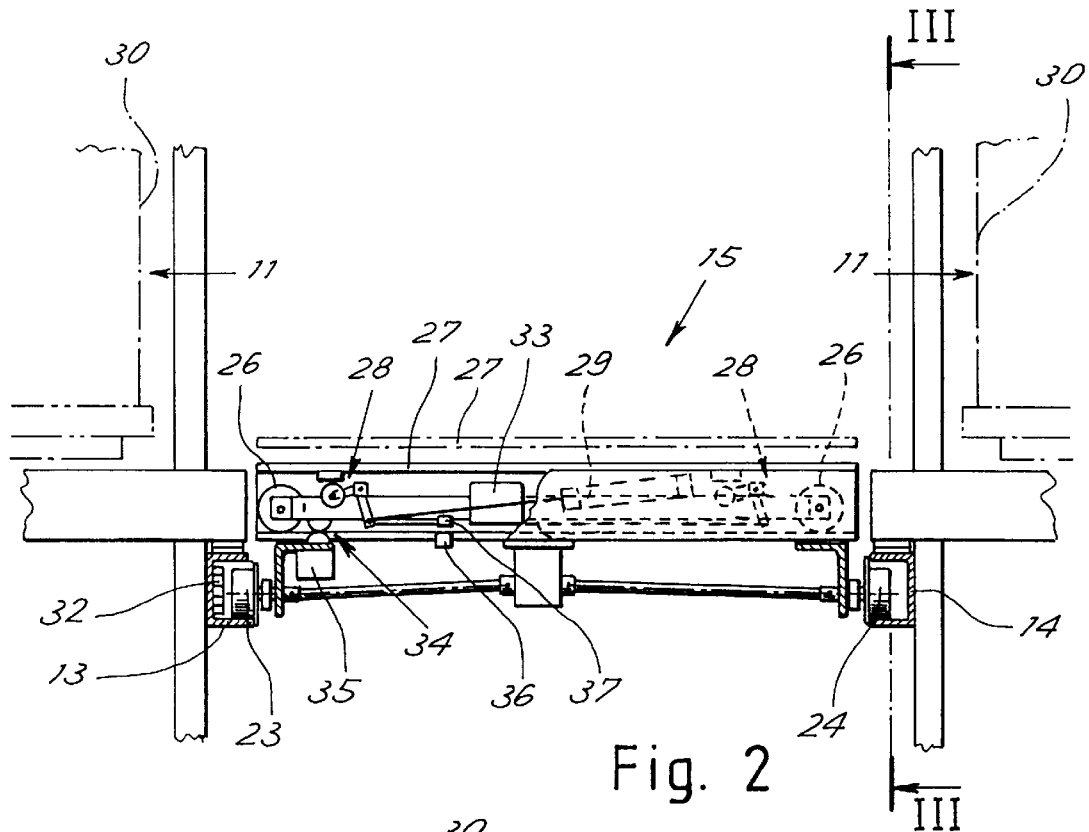
FIG. 2 shows a schematic enlarged partial cross-sectional front view of a car of the depot of FIG. 1.
Figure 3:
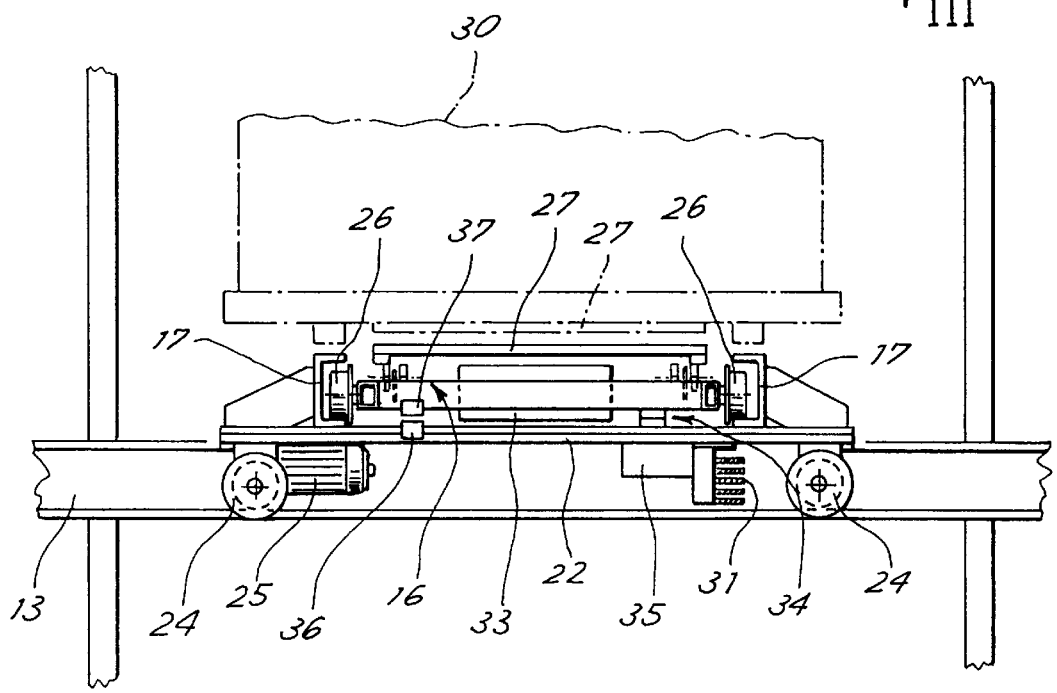
FIG. 3 shows a view along the line III—III of FIG. 2.

FIGS. 2 and 3 show, in greater detail, a car 15 (in FIG. 2 seen from the direction OX). The car 15 comprises a frame 22 bearing wheels 23, 24 to run along the rails 13, 14 and 20, 21. At least one pair of wheels is motor-driven by means of an electric motor 25. The frame 22 supports the pair of rails 17 along which, by means of motor-driven wheels 26, runs the trolley 16. The trolley 16 is provided superiorly with a loading platform 27 which can move vertically (as shown by the broken line) by means of a connecting rod and crank hoisting gear 28, operated by an actuator 29.

The vertical movement of the platform makes it possible to lift and deposit a load 30 onto the car 15, as can be clearly seen in FIG. 3, and into the cell, as can be clearly seen in FIG. 2.

The car 15 obtains the electric power for its movement along the corridor by collecting it, through sliding brushes or contacts 31 of known technique, which slide over contact lines 32 disposed along a rail 13 or 14.

Figure 4:
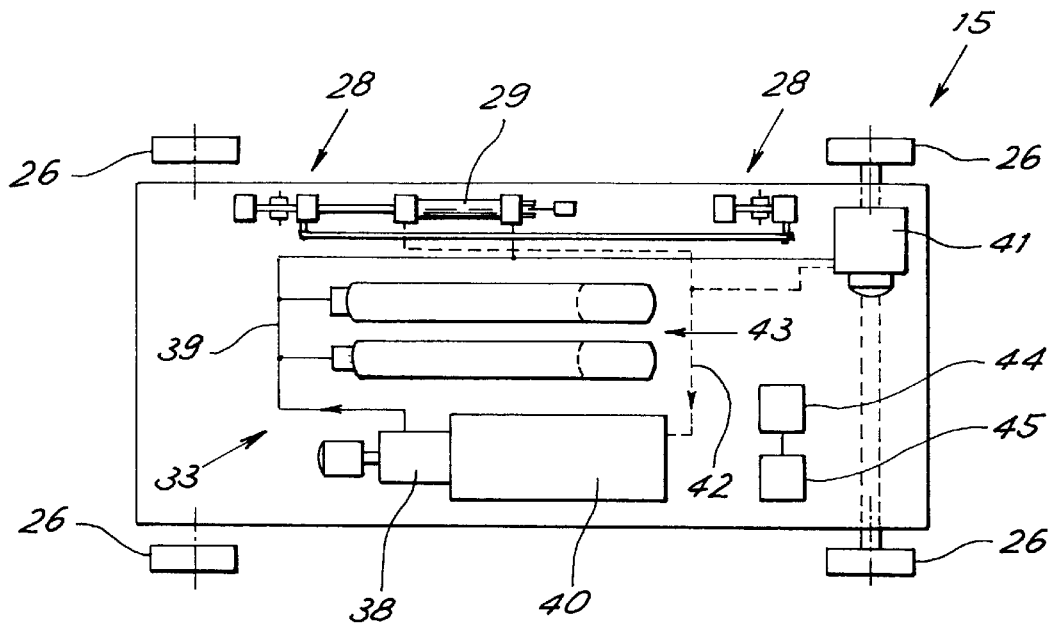
FIG. 4 shows a schematic plan view of the car of FIG. 2.

According to the innovative principles of this invention, the trolley 16 is fitted with an innovative system 33 for controlling and driving the wheels of the trolley and the kinematic mechanism for raising and lowering the platform. FIG. 4 schematically shows the system fitted on the trolley. This system comprises an electric pump 38 which sends fluid under pressure along ducts 39, withdrawing it from a tank 40. The fluid is supplied to the hoisting actuator 29, which is made in the form of an hydraulic cylinder, and to an hydraulic motor 41 for rotation of the wheels of the trolley. Backflow ducts 42 connect the actuator and motor to the tank. Inserted in the hydraulic delivery circuit are one or more hydraulic power accumulators 43 which, when charged, serve as sources of power under pressure. The aforesaid accumulators, per se substantially known, can for example be of the hydropneumatic type and comprise a rigid airtight outer casing which contains a part connected to the external fluid circuit and a part containing gas, separated by a movable or flexible baffle. Thus, when the fluid is put under pressure, the gas is compressed, and then re-expands when the fluid is required to produce work.

The drive system is controlled by a microprocessor or cabled logic electronic control unit 44, which is per se known and consequently not further shown or described herein. The control unit 44 is powered by a low-power electric accumulator 45. The control unit can exchange signals with the car and the outside through connections 36, 37.

Figure 5:
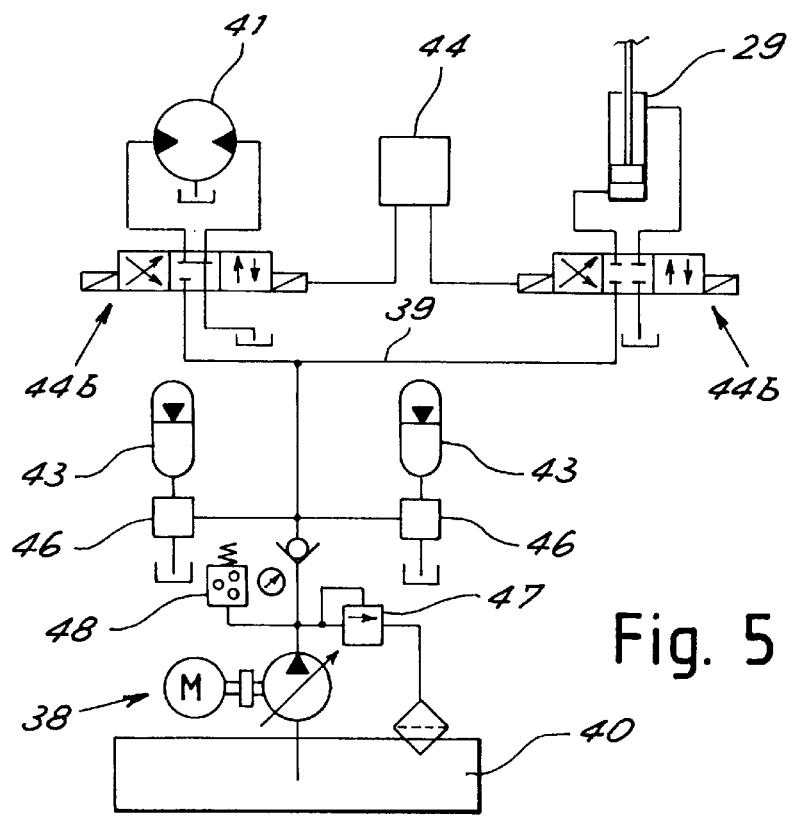
FIG. 5 shows a possible hydropneumatic circuit of the car of FIG. 2.

FIG. 5 shows a possible diagram of the hydropneumatic system of the trolley. The hydraulic motor 41 and actuator 29 are controlled by the unit 44 by means of distributors 44b. The hydropneumatic accumulators are connected to the system by means of safety blocks 46.

Fitted on the delivery side of the pump are a maximum pressure valve 47 and a minimum pressure switch 48. When in use, during the period that the trolley is in position on the car (for example during the transfer of the car from one cell to another), the coupling 34 between the car and trolley is connected and the trolley is supplied with electric power provided by a power supply circuit 35 disposed on the car which in turn is powered by the circuit 31, 32.

The electric pump 38 can thus be operated so that the hydropneumatic accumulators are recharged. The recharging can also be carried out at high speed and in very small proportions, according to need. Moreover, compared to electric accumulators there is no limit to the recharging frequency or to the number of charging-discharging cycles. It can also be arranged for the recharging to be carried out every pre-established number of times the trolley is inserted in the cells, depending upon the capacity of the hydraulic accumulators. At the same time, the electric batteries 45 can be recharged, if necessary.

It should be noted that the electric batteries are low powered, since they do not have to supply the power to move the trolley, and consequently do not suffer the disadvantages produced by high-power batteries which are necessary in the known embodiments. At the most, due to the low consumption of the electrical part of the trolley according to the invention, the batteries can also be recharged at regular intervals.

When the car is positioned in front of a cell to be served, the trolley moves towards the cell and the loading platform ascends and descends using the power stored in the hydropneumatic accumulators, without any power connection with the car, the coupling 34 disconnecting itself automatically upon movement of the trolley. Mechanical connections can obviously be provided if necessary between the car and the trolley (for example for the limit stop) as well as electric signal connections. The latter, being low-powered and consequently requiring relatively thin conductors, do not suffer from the problems that there would be in the case of power supply conductors.

Advantageously, known cordless communication systems can be used for the control such as optical communication systems, which are well-known to the experts in the field. It is thus possible to avoid all electrical connections between car and trolley, at least when the trolley is extended outside the car.

For example, the connections 36 and 37 can be achieved by known optical transreceiving devices disposed on the car and trolley, respectively.

The trolley can also comprise detectors (optical or mechanical) of projections inside the cells, to identify for example the position for withdrawing and unloading the load.

At this point it will be clear how the intended scopes have been achieved, by providing a cellular depot, in which the permanent electric connections for supplying power between the transport car and the inserting and extracting trolley have been eliminated.

The foregoing description of an embodiment applying the innovative principles of this invention is obviously given by way of example in order to illustrate such innovative principles and should not therefore be understood as a limitation to the sphere of the invention claimed herein. For example, the general structure of the depot and the cars can be varied according to practical requirements. Moreover, the recharging electric pump can be disposed on the car. In which case, the automatic coupling 34 is achieved in the form of an hydraulic connection between the pump and the hydropneumatic accumulators.

As mentioned previously, the hydropneumatic accumulators can be more than one in number, for example connected to each other in parallel, to supply sufficient power between one recharging and another, while maintaining the overall dimensions of the trolley limited, especially in height.

What is claimed is:

1. Cellular depot comprising a plurality of cells facing a corridor, at least one motor-driven car running through the corridor to convey loads between the cells, the car comprising a trolley, motor-driven to move between one of said at least one car and an inside of the plurality of cells and transfer a load to and from the one car and the plurality of cells, the trolley comprises hydraulic driving means connected to an independent source of fluid under pressure disposed on the trolley, for a power supply, and the independent source of fluid being recharged when the trolley rests on the car, the independent source of fluid including accumulators of fluid under pressure, an electric pump located on the trolley withdrawing fluid from a tank and having a delivery side supplying the accumulators, and an automatic electric coupling located between the car and the trolley which, when the trolley is accommodated on the car, automatically connects an electric power supply of the electric pump to a source of electric power reaching the car.

2. Depot as claimed in claim 1, wherein the accumulators comprise hydropneumatic accumulators.

3. Depot as claimed in claim 1, wherein the source of electric power reaching the car is the electric power supply of the car.

4. Depot as claimed in claim 3, wherein the source of power reaches the car through contact lines disposed along rails on which the car runs along the corridor.

5. Depot as claimed in claim 1, wherein the trolley comprises a platform movable between a lowered position and a raised position for raising and lowering the load, said hydraulic drive means comprising an hydraulic actuator for moving the platform between the lowered and raised position.

6. Depot as claimed in claim 1, wherein the hydraulic driving mans comprise an hydraulic motor for translation of the trolley.

7. Cellular depot comprising a plurality of cells facing a corridor, at least one motor-driven car running through the corridor to convey loads between the cells, the car comprising a trolley, motor-driven to move between one of said at least one car and an inside of the plurality of cells and transfer a load to and from the one car and the plurality of cells, the trolley comprises hydraulic driving means connected to an independent source of fluid under pressure disposed on the trolley, for a power supply, and the independent source of fluid being recharged when the trolley rests on the car, and cordless communication devices for exchange of controls and information disposed between the car and the trolley.

8. Depot as claimed in claim 7, wherein the trolley comprises a platform movable between a lowered position and a raised position for raising and lowering the load, said hydraulic drive means comprising an hydraulic actuator for moving the platform between the lowered and raised position.

9. Depot as claimed in claim 7, wherein the hydraulic driving mans comprise an hydraulic motor for translation of the trolley.

10. Cellular depot comprising a plurality of cells facing a corridor, at least one motor-driven car running through the corridor to convey loads between the cells, the car comprising a trolley, motor-driven to move between one of said at least one car and an inside of the plurality of cells and transfer a load to and from the one car and the plurality of cells, the trolley comprises hydraulic driving means connected to an independent source of fluid under pressure disposed on the trolley, for a power supply, and the independent source of fluid being recharged when the trolley rests on the car, and a control unit disposed on the trolley being powered by an electric battery recharged through an automatic electric connection between the trolley and the car when the trolley is accommodated on the car.

11. Depot as claimed in claim 10, wherein the trolley comprises a platform movable between a lowered position and a raised position for raising and lowering the load, said hydraulic drive means comprising an hydraulic actuator for moving the platform between the lowered and raised position.

12. Depot as claimed in claim 10, wherein the hydraulic driving mans comprise an hydraulic motor for translation of the trolley.

\* \* \* \* \*